US008000183B2

(12) United States Patent
Satou et al.

(10) Patent No.: US 8,000,183 B2
(45) Date of Patent: Aug. 16, 2011

(54) OBJECT LENS ACTUATOR, OPTICAL PICKUP AND OPTICAL DISK DRIVE

(75) Inventors: Yoshihiro Satou, Hitachinaka (JP); Hidenao Saito, Yokohama (JP); Jun Hato, Fujisawa (JP); Ryuichiro Mizuno, Fujisawa (JP); Katsuhiko Kimura, Kasumigaura (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 280 days.

(21) Appl. No.: 12/255,077

(22) Filed: Oct. 21, 2008

(65) Prior Publication Data
US 2009/0103421 A1    Apr. 23, 2009

(30) Foreign Application Priority Data
Oct. 23, 2007   (JP) ................................. 2007-274926

(51) Int. Cl.
*G11B 7/00* (2006.01)
(52) U.S. Cl. .................................................... 369/44.15
(58) Field of Classification Search ............... 369/44.15, 369/44.16, 44.21, 44.22, 53.19, 44.32
See application file for complete search history.

(56) References Cited

U.S. PATENT DOCUMENTS

| | | | | |
|---|---|---|---|---|
| 5,164,936 A | * | 11/1992 | Kagami ...................... | 369/44.15 |
| 5,228,017 A | * | 7/1993 | Matsuzaki et al. ......... | 369/44.15 |
| 5,305,151 A | * | 4/1994 | Kakimoto et al. ......... | 369/44.16 |
| 7,287,264 B2 | * | 10/2007 | Akanuma .................... | 720/681 |
| 2001/0026404 A1 | * | 10/2001 | Suh .............................. | 369/44.16 |
| 2001/0030815 A1 | * | 10/2001 | Suh ............................... | 359/814 |

FOREIGN PATENT DOCUMENTS

| | | |
|---|---|---|
| JP | 11-66587 | 3/1999 |
| JP | 2003-228852 | 8/2003 |
| JP | 2004-13997 | 1/2004 |
| JP | 2004-281018 | 10/2004 |
| JP | 2006-236437 | 9/2006 |

OTHER PUBLICATIONS

Kawasaki et al., Radial and Tangential-Tilt Servo Using Four-Axis Actuator, Ricoh Technical Report, (Dec. 2005), No. 31, pp. 47-51.
Office Action issued in Japanese Patent Application No. 2007-274926 on Mar. 8, 2011.

* cited by examiner

*Primary Examiner* — Thang V Tran
(74) *Attorney, Agent, or Firm* — Antonelli, Terry, Stout & Kraus, LLP.

(57) ABSTRACT

The present invention provides an object lens actuator, an optical pickup, and an optical disk drive, which can increase the size of the object lens actuator driving a lens holder in the tangential tilt direction, and drive and control the lens holder with a small amount of drive current.

An object lens actuator comprising a lens holder having an object lens and a first coil; a first magnet fixed to a yoke; plural elastic support parts for supporting said lens holder with a first fulcrum; a moving part for supporting said elastic support parts with a second fulcrum different from said first fulcrum, and a fixed part having a moving mechanism for moving said moving part, wherein said first coil and said first magnet constitute a first magnetic circuit, said first magnetic circuit makes said lens holder movable in a focusing direction, a tracking direction and a radial tilt direction of an optical disk for read/write, and said moving mechanism makes said moving part movable.

9 Claims, 8 Drawing Sheets

FIG. 1

FOCUSING DIRECTION
RADIAL TILT DIRECTION
TANGENTIAL TILT DIRECTION
TRACKING DIRECTION
TANGENTIAL DIRECTION

OBJECT LENS ACTUATOR, OPTICAL PICKUP AND OPTICAL DISK DRIVE

CLAIM OF PRIORITY

The present application claims priority from Japanese patent application serial No. 2007-274926, filed on Oct. 23, 2007, the content of which is hereby incorporated by reference into this application.

BACKGROUND OF THE INVENTION

1. Field of the Invention

The present invention relates to an optical disk drive, and an object lens actuator and an optical pickup constituting the optical disk drive.

2. Description of Related Art

In recent years, a densification of an optical disk advances and, to cope with the trend, a wavelength of a laser is shortened or an aperture of an object lens is expanded. In such a situation, a tilt of an object lens from an optical disk tends to increasingly influence a quality of an optical spot. A signal deterioration of the optical spot caused by the tilt of the object lens leads to the signal deterioration at record/read and hence it comes to be necessary to reduce the angle (tilt) between the optical disk and the object lens.

Such optical disk drive has an object lens actuator to drive the object lens to condense a light on a recording surface of the optical disk in a focusing direction (in a direction close to/away from an optical disk surface), in a tracking direction (in a radial direction of the optical disk), in a radial tilt direction (tilting toward a direction of an optical disk radius), and in a tangential tilt direction (tilting toward a direction of a tangential line of the optical disk).

A moving part support equipment including a holder equipped with the object lens and coils of the object lens actuator is arranged so that elastic support parts one end and the other end of each of which are fixed to a moving part and a fixed part respectively, namely plural straight springs, may form a parallel link.

Document 1 (Japanese Patent Laid-open No. 2003-228852) discloses an optical pickup provided with an actuator having a taper and a screw, which does not require securing a space for skew adjustment of an object lens to an optical disk on a side of an optical system location.

Further, Document 2 (Japanese Patent Laid-open No. 2006-236437) and Document 3 (Ricoh Technical Report No. 31, pp. 47 to 51 (2005)) disclose an optical disk system having plural coils in a lens holder and an actuator of four axes including an axis in the tangential tilt direction.

The optical disk system described in Document 2 and Document 3 is configured so as to control a lens holder in four directions including the tangential tilt direction.

However, since the lens holder has plural coils including a tangential tilt drive coil, the mass of the lens holder increases and the control of tilt in two directions is complicated.

An object of the present invention is to provide an object lens actuator, an optical pickup, and an optical disk drive, which can reduce a mass of a coil installed on a lens holder and thus reduce a moment of inertia of the lens holder, can increase a size of the object lens actuator to drive the object lens in the tangential tilt direction, and can drive and control the lens holder with a small amount of drive current.

SUMMARY OF THE INVENTION

An object lens actuator comprising a lens holder having an object lens and a first coil; a first magnet fixed to a yoke; plural elastic support parts for supporting said lens holder with a first fulcrum; a moving part for supporting said elastic support parts with a second fulcrum different from said first fulcrum, and a fixed part having a moving mechanism for moving said moving part, wherein said first coil and said first magnet constitute a first magnetic circuit, said first magnetic circuit makes said lens holder movable in a focusing direction, a tracking direction and a radial tilt direction of an optical disk for read/write, and said moving mechanism makes said moving part movable.

The present invention makes it possible to reduce the mass of a coil installed on a lens holder and thus to reduce the moment of inertia of the lens holder, and to increase the size of an object lens actuator driving the lens holder in the tangential tilt direction. Further, the present invention makes it possible to provide an object lens actuator, an optical pickup, and an optical disk drive, which can drive and control the lens holder with a small amount of drive current.

DETAILED DESCRIPTION OF THE INVENTION

Embodiments according to the present invention are hereunder explained in reference to drawings.

First Embodiment

Figure 1:
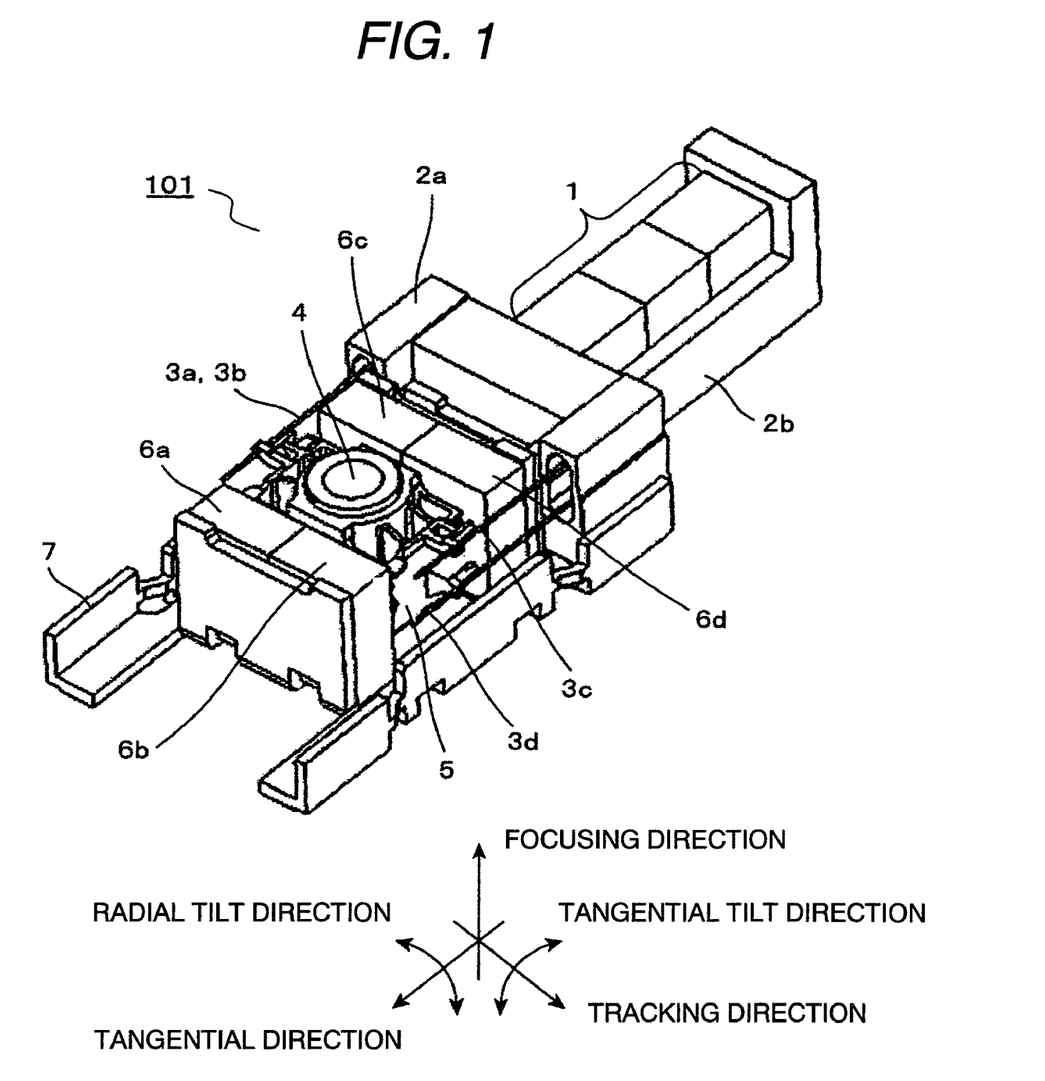
FIG. 1 is a perspective view explaining a first embodiment according to the present invention.
Figure 2:
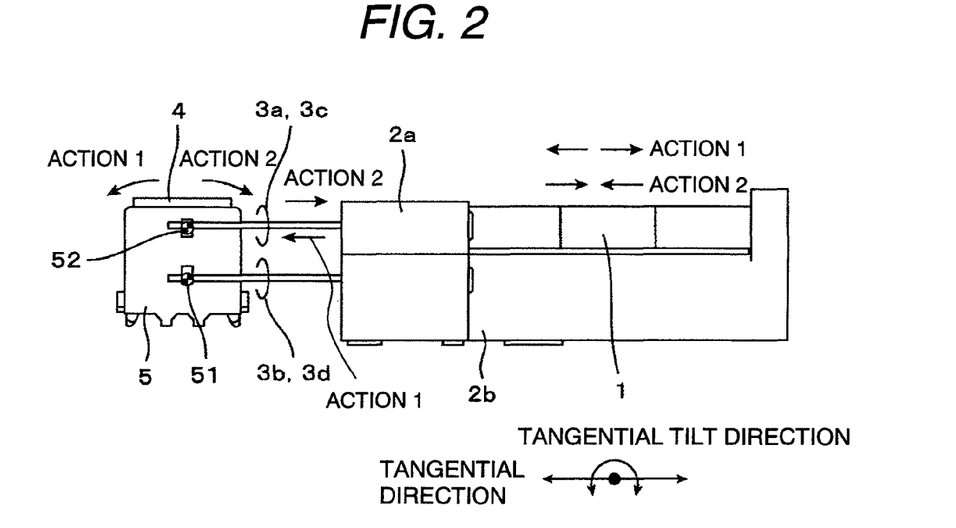
FIG. 2 is a side view explaining a principle in the first embodiment according to the present invention.
Figure 3:
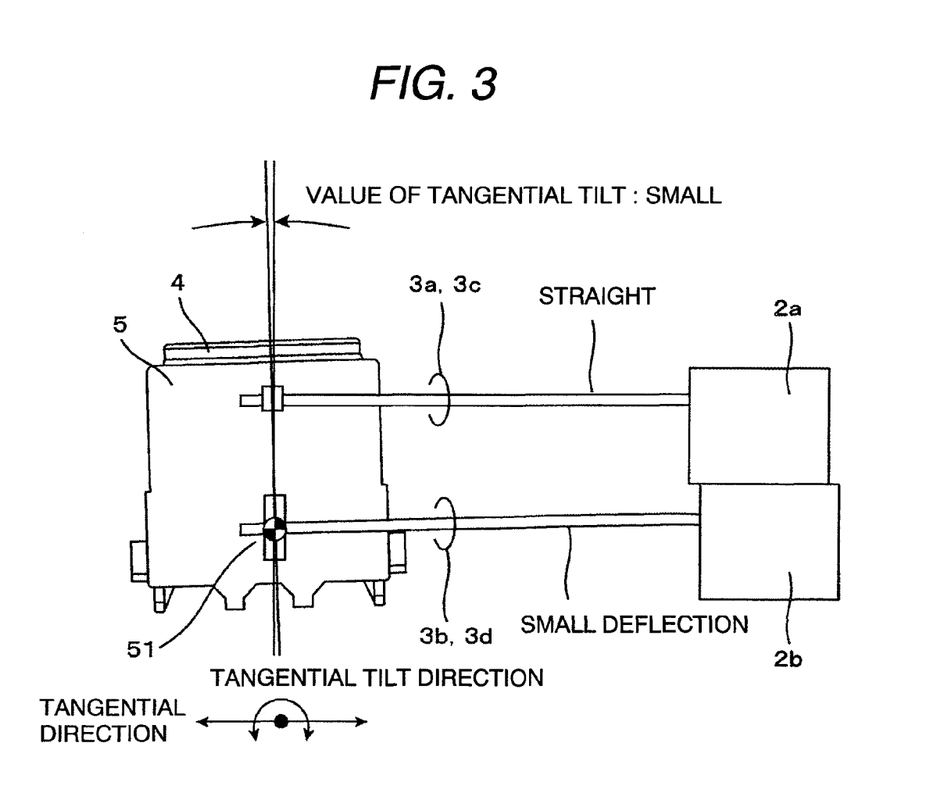
FIG. 3 is a side view explaining an initial movement in the first embodiment according to the present invention.
Figure 4:
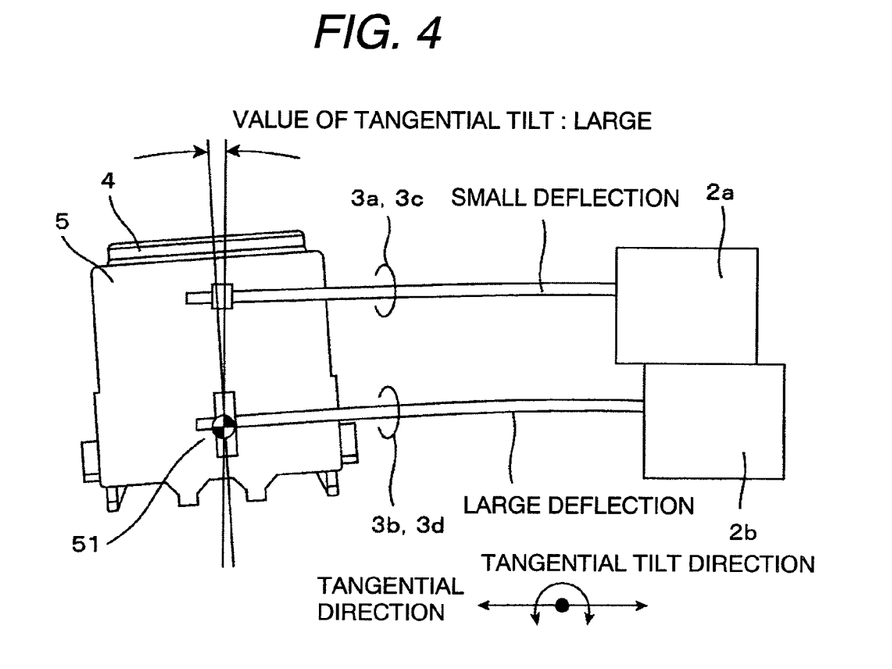
FIG. 4 is a side view explaining a movement in the first embodiment according to the present invention.
Figure 9:
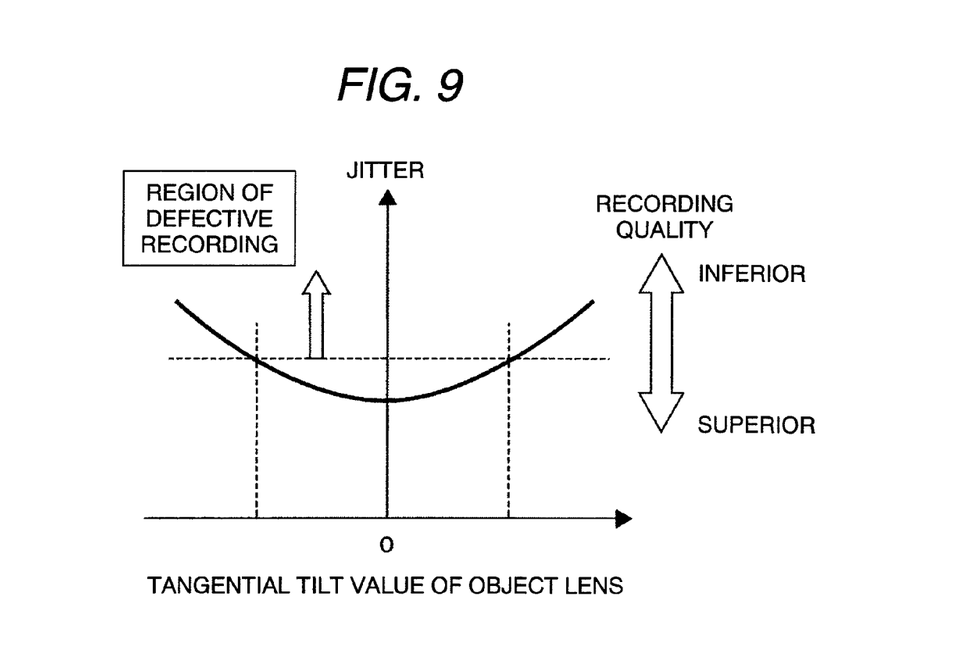
FIG. 9 is a graph showing a relationship between a tilt of an object lens in a tangential direction and a recording jitter in the present invention.

A first embodiment according to the present invention is explained with FIGS. 1, 2, 3, 4 and 9. FIG. 1 is an external view showing an object lens actuator according to this embodiment, FIG. 2 is a side view, showing a movement in this embodiment, of the object lens actuator excluding a yoke and a magnet, FIG. 3 is a side view showing an initial movement in this embodiment, FIG. 4 is a side view showing the movement according to the present invention, and FIG. 9 is a graph showing a characteristic of jitter when an object lens tilts in a direction of a tangential line of an optical disk.

Jitter is an index showing accuracy at a reproduction of an optical disk data and also an index showing accuracy of a recording at a data recording. An increase of a jitter value means a deterioration of a recording quality. A tilt in an optical disk radial direction influences the jitter more than a tilt in an optical disk tangential direction. The tilt of the object lens in the optical disk radial direction has already been compensated as described in Document 1.

In the case of an optical pickup that uses a short-wavelength laser such as a blue laser however, a lens of a high NA must be used by its nature and the influence, which has heretofore been ignorable, of an object lens tilting in the tangential direction of the optical disk on jitter increases. For that reason, a mechanism for compensating the tilt of the object lens in the tangential direction of the optical disk is needed.

The specific feature of this embodiment is that an object lens actuator is configured so that the object lens actuator may include plural straight springs $3a$, $3b$, $3c$ and $3d$ for supporting a lens holder 5 with first fulcrums 51 and 52, a moving part $2a$ for supporting the straight springs $3a$ and $3c$ with second fulcrums (not shown in the figures) that are different from the first fulcrums 52, and a fixed part $2b$ for supporting the straight springs $3b$ and $3d$ with second fulcrums (not shown in the figures) that are different from the first fulcrums 51, and the fixed part $2b$ may have a moving mechanism 1 for moving the moving part $2a$. In this embodiment, since the straight springs $3a$, $3b$, $3c$ and $3d$ are made of wires, the straight springs $3a$, $3b$, $3c$ and $3d$ are hereunder referred to as support wires. Besides the wires shown in this embodiment, leaf springs or the like may be also applicable to the straight springs $3a$, $3b$, $3c$ and $3d$. Although the first fulcrums 51 and 52 are fixed in this embodiment, they may be rotatable. Further, the second fulcrums are desirably non-rotatable.

An object lens 4 is attached to the lens holder 5. The lens holder 5 is made movable so that the object lens 4 may focus a laser on an optical disk not shown in the figures, and is elastically supported by the moving part $2a$ and the fixed part $2b$ through the support wires $3a$, $3b$, $3c$ and $3d$ as the elastic support parts. The support wires $3b$ and $3d$ are supported by the support parts 51 (the first fulcrums) of the lens holder 5 in a rotatable manner. Further, the support wires $3a$ and $3c$ are supported by the support parts 52 (the first fulcrums) of the lens holder 5 in a rotatable manner. The moving directions of the lens holder 5 are the focus, tracking, radial tilt and tangential tilt directions.

The structure for driving the lens holder 5 in the tangential tilt direction is explained hereunder.

The moving part $2a$ can be driven by the moving mechanism 1 installed on the fixed part $2b$ from the fixed part $2b$ to the direction of the tangential line of an optical disk (hereunder referred to as the tangential direction). Thereby the moving part $2a$ can be positioned on the basis of the fixed part $2b$.

In this embodiment, the moving mechanism 1 comprises at least one of a piezoelectric actuator, an electrostatic actuator, a stepping motor and an ultrasonic motor and drives the lens holder 5 by external voltage. Further, the lens holder 5 adjusts the focus of a laser on an optical disk by the electromagnetic action between first coils (not shown in the figures) installed on the lens holder 5 and first magnets $6a$, $6b$, $6c$ and $6d$ disposed on the surfaces facing the first coils. The first coils and the first magnets $6a$, $6b$, $6c$ and $6d$ constitute a first magnetic circuit. The first magnets $6a$, $6b$, $6c$ and $6d$ are supported by a yoke 7. The yoke 7 does not only support the magnets $6a$, $6b$, $6c$ and $6d$ but also supports the lens holder 5 and the fixed part $2b$, namely supports the whole object lens actuator.

Successively, a movement in the first embodiment according to the present invention is explained with FIGS. 2, 3, 4 and 9. The moving mechanism 1 is activated by external voltage and expands and contracts in the tangential direction. By so doing, the moving part $2a$ displaces relatively from the fixed part $2b$. Then the support wires $3b$ and $3d$ for connecting the fixed part $2b$ to the lens holder 5 do not move and the support wires $3a$ and $3c$ for connecting the moving part $2a$ to the lens holder 5 move in the direction in which the moving part $2a$ moves.

For example, at an initial stage of the movement, namely when the magnitude of expansion of the moving mechanism 1 is minute as shown in FIG. 3 in the case of movement 1 in FIG. 2, the moving part $2a$ moves toward the lens holder 5 and pushes the first fulcrums 52 of the lens holder 5 while the support wires $3a$ and $3c$ keep straightness. Thereby, moment appears around the first fulcrums 51 of the lens holder 5 supported by the support wires $3b$ and $3d$ and the support wires $3b$ and $3d$ deflect minutely.

Further, when the tilt of the lens holder 5 is required to increase, as shown in FIG. 4, in order to increase the relative displacement between the moving part $2a$ and the fixed part $2b$, the moving mechanism 1 is further expanded and pushes the lens holder 5 with the support wires $3a$ and $3c$. On this occasion, the support wires $3a$ and $3c$ deflect minutely and the magnitude of the deflection of the support wires $3b$ and $3d$ further increases. On this occasion, the first fulcrums 51 of the lens holder 5 act as the center of the rotation of the lens holder 5 of the support wires $3b$ and $3d$. By the above movement, the support wires $3a$ and $3c$ move relatively from the support wires $3b$ and $3d$ in the support wire axis direction, namely in the tangential direction, thereby the lens holder 5 rotates in the direction of the movement 1, namely tilts tangentially, and the tilt in the tangential direction of the optical disk can be compensated.

Further, with regard to the movement in the opposite direction too, the support wires $3b$ and $3d$ is buckled by the movement in the direction of the movement 2 shown in FIG. 2 and the lens holder 5 tilts in the direction opposed to the direction of the movement 1. By so doing, the tilt in the tangential direction of the optical disk can be compensated similarly to the above case. On this occasion, the first fulcrums 52 of the support wires $3a$ and $3c$ at the lens holder 5 act as the center of the rotation of the lens holder 5.

Since the center of rotation when the tangential tilt direction is the forward direction is different from the center of rotation when the tangential tilt direction is the backward direction, displacement appears in the focus direction but it is possible to compensate the displacement in the focus direction by applying focus control at the same time. The aforementioned compensation to the tangential tilt of the object lens 4 is described on the basis of the case where the stiffness of the support wires $3a$ and $3c$ is identical to the stiffness of the support wires $3b$ and $3d$. When the stiffness of the support wires $3a$ and $3c$ is smaller than the stiffness of the support wires $3b$ and $3d$ however, the magnitude of the deflection of the wires at the tangential tilt compensation may be reversed between the support wires $3a$ and $3c$ and the support wires $3b$ and $3d$ in some cases. That is, the support wires $3a$ and $3c$ may deflect considerably and the support wires $3b$ and $3d$ may deflect minutely. On this occasion too, the tangential tilt of the object lens can be compensated.

The range of the compensation of the tangential tilt is shown in FIG. 9. As shown in FIG. 9, when a tilt from the optical disk appears, the jitter deteriorates and thus recording quality also deteriorates. When recording quality deteriorates, a region of defective recording appears. To cope with the problem, the maximum value of the tilt of the object lens 4 is determined so that the jitter value may not reach the region. The tilt is about 0.15° or less in the case of an optical pickup using a blue laser. Since the distance satisfying the maximum tilt angle is the sine component of a wire interval, the necessary amount of the displacement of the moving mechanism 1 is at most several tens microns. In the movement, it is also possible to dynamically control the tangential tilt of an object lens 5 in proportion to optical disk rotation, and to compensate the tilt in the tangential direction of an optical disk beforehand before the rotation of the optical disk and use the compensation as offset.

As explained above, in this embodiment, it is possible to reduce the defective recording on the optical disk by compensating the tilt of the optical disk in the circumferential direction, namely in the tangential direction, of the optical disk with the tilt of the object lens 4, to suppress the variation of recording quality on the optical disk by dynamically controlling the compensation of the tilt of the object lens 4 in synchronization with the rotation of the optical disk, and to resultantly obtain an optical pickup having a high reliability.

Further, it is possible to reduce the mass of the first coils installed on the lens holder 5 and to reduce the moment of inertia of the lens holder 5, and to increase a size of the object lens actuator for driving the lens holder 5 in the tangential tilt direction. Furthermore, it is possible to provide the object lens actuator, the optical pickup, and the optical disk drive, which can drive and control the lens holder 5 with a small amount of drive current.

Second Embodiment

Figure 5:
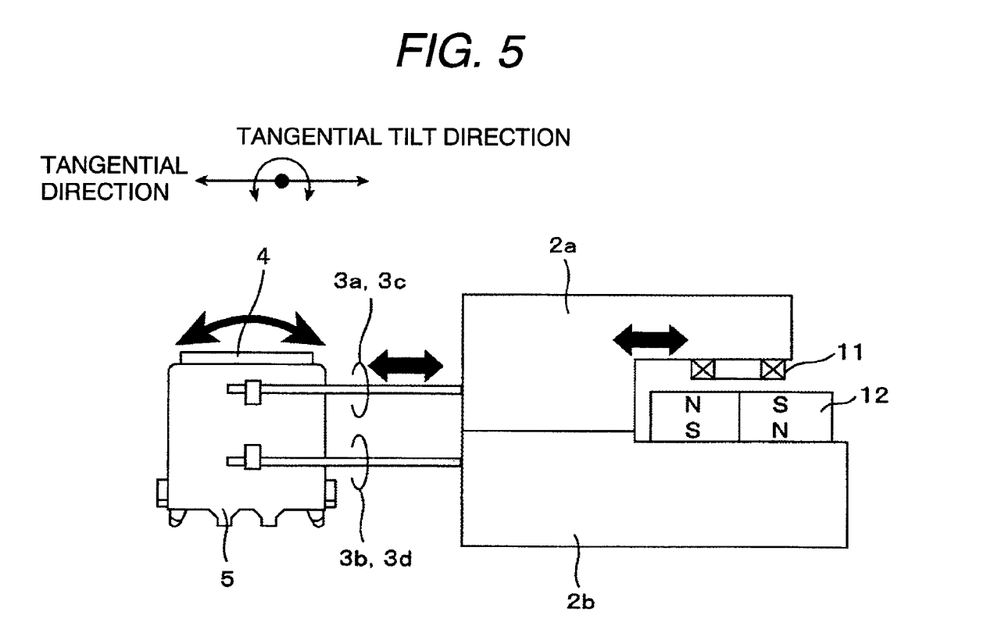
FIG. 5 is a side view explaining a second embodiment according to the present invention.
Figure 6:
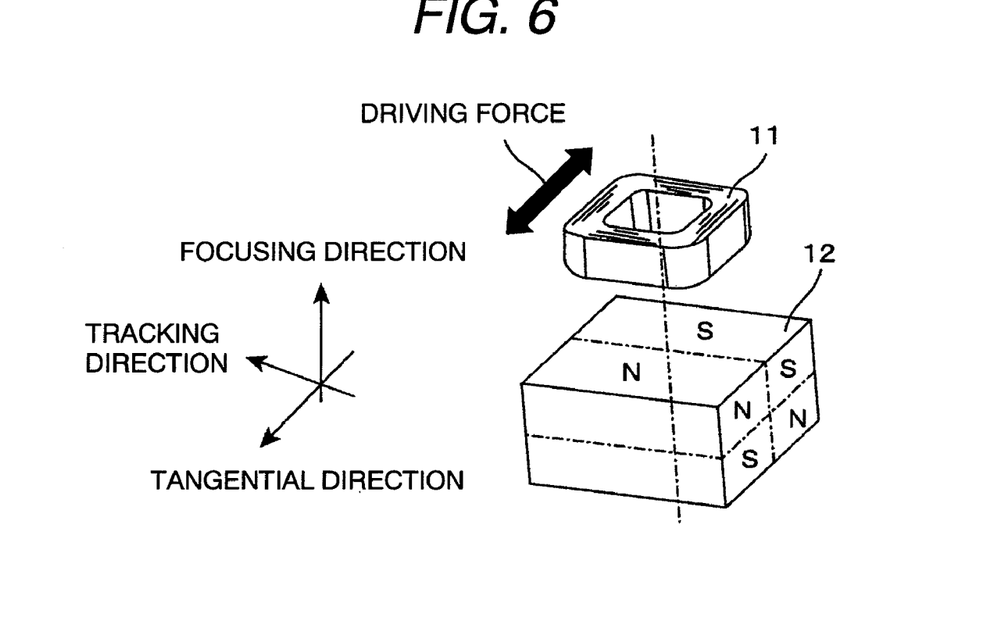
FIG. 6 is a perspective view explaining a magnetic circuit structure of a moving mechanism in the second embodiment according to the present invention.

A second embodiment according to the present invention is explained with FIGS. 5 and 6. FIG. 5 is a side view in this embodiment from which a yoke and magnets are excluded, and FIG. 6 is a perspective view explaining the arrangement of a coil and a magnet in a moving mechanism that is the specific feature of this embodiment.

The specific feature of this embodiment is that the moving mechanism for relatively moving the moving part 2a from the fixed part 2b comprises a second magnetic circuit 11 and 12. The second magnetic circuit comprises a second coil 11 installed on the moving part 2a and a second magnet 12 installed on the fixed part 2b. As shown in FIG. 6, the second magnet 12 is magnetized into two N and S poles on the surface facing the second coil 11 and the N and S poles are disposed on an identical plane. The positional relation between the second coil 11 and the second magnet 12 is shown below. The second coil 11 is placed so as to face a plane of the second magnet 12 while having a space in between. The type of the winding of the second coil 11 is planar winding. They are positioned so that the air core part of the second coil 11 may overlap with the boundary of the magnetic pole of the second magnet 12. Further, it is desirable that the area of the second magnet 12 is larger than an area facing the second coil 11.

By the above configuration, it is possible to realize a low-profile, namely thin, moving mechanism. When the second coil 11 and the second magnet 12 are arranged and a voltage or an electric current is applied to the second coil 11, a driving force acts in the plane of the second coil 11. Since the driving force moves the object lens 4 in the tangential tilt direction, the tilt of the object lens 4 can be controlled by the voltage applied to the second coil 11. In this embodiment, the similar effect can be obtained even when the installation positions of the second coil 11 and the second magnet 12 are reversed. The movement principle in the tilt of the object lens 4 is the same as that in the first embodiment.

As explained above, in this embodiment, since the mechanism for tilting an object lens 4 comprises a coil 11 and a magnet 12, it is possible to obtain an object lens actuator of a low cost and a low profile.

Third Embodiment

Figure 7:
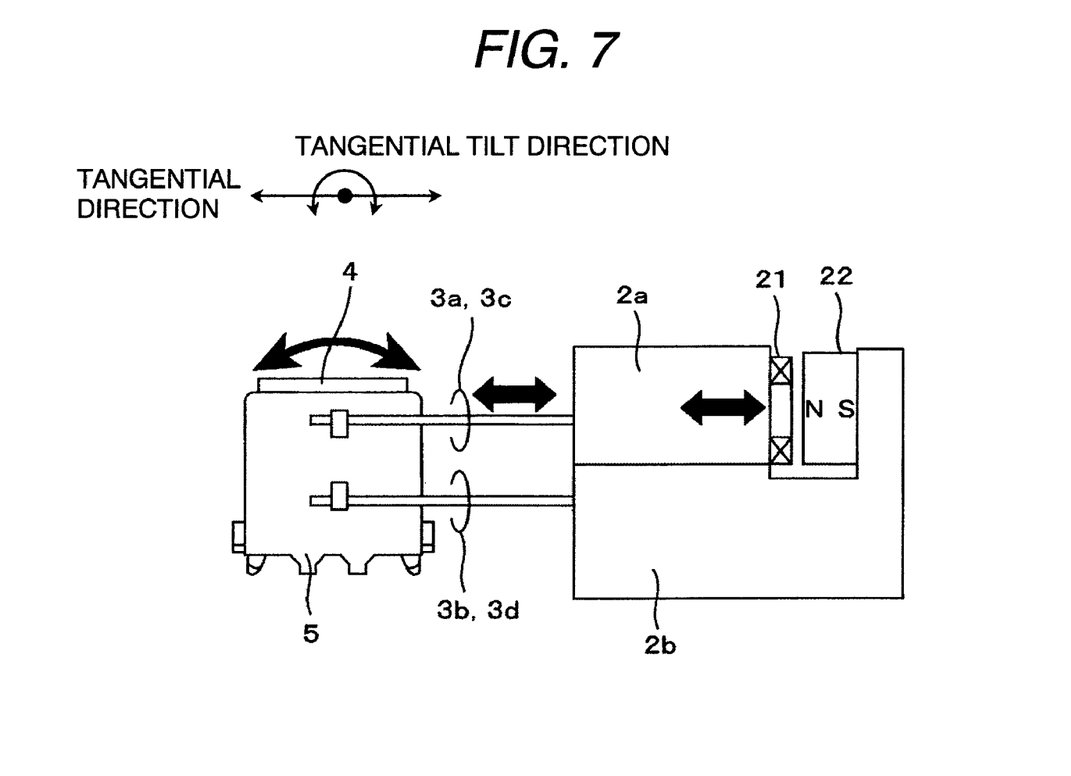
FIG. 7 is a side view explaining a third embodiment according to the present invention.
Figure 8:
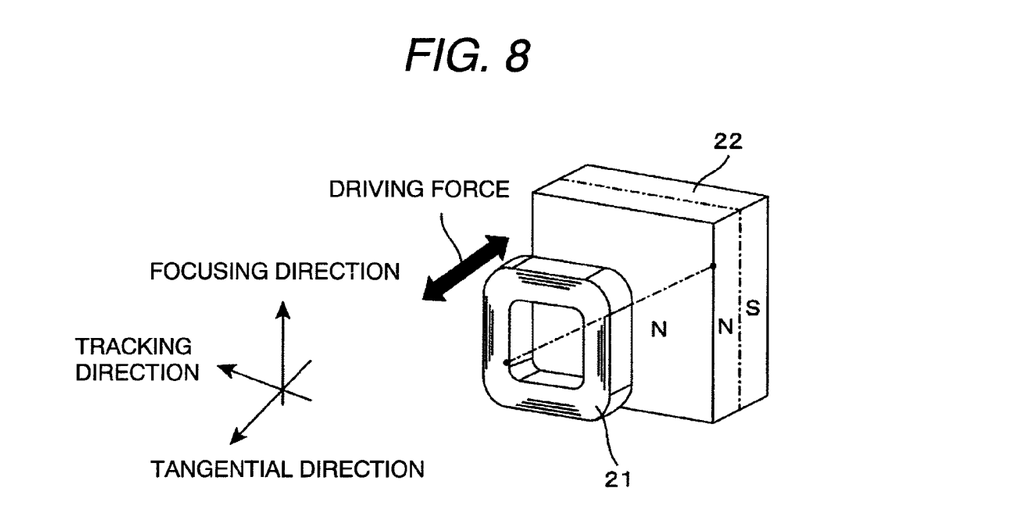
FIG. 8 is a perspective view explaining a magnetic circuit structure of a moving mechanism in the third embodiment according to the present invention.

A third embodiment according to the present invention is explained with FIGS. 7 and 8. FIG. 7 is a side view in this embodiment from which a yoke and magnets are excluded, and FIG. 8 is a view explaining the arrangement of a coil and a magnet of a moving mechanism that is the specific feature of this embodiment.

The specific feature of this embodiment is that a second magnetic circuit 21 and 22 that is a moving mechanism for relatively moving the fixed part is arranged in the tangential direction in order to shorten the lengths of the moving part 2a and the fixed part 2b. The second magnetic circuit 21 and 22 comprises a second coil 21 installed on the moving part 2a and a second magnet 22 installed on the fixed part 2b. As shown in FIG. 8, the second magnet 22 is magnetized in the thickness direction and an N pole and an S pole are formed on the front and back sides of the second magnet 22, respectively. It goes without saying that the front side may be an S pole and the back side may be an N pole.

The positional relation between the second coil 21 and the second magnet 22 is shown below. The second coil 21 is placed so as to face a plane of the second magnet 22 while having a space in between. A type of a winding of the second coil 21 is a planar winding. Further, it is desirable that an area of the second magnet 22 is larger than an area facing the second coil 21. By the above configuration, it is possible to realize a moving mechanism having a short total length. When the second coil 21 and the second magnet 22 are arranged and a voltage is applied to the second coil 21, an N pole or an S pole is formed in the second coil 21 in accordance with a direction of an electric current under the right-handed screw rule. A driving force of repulsion or attraction acts on the second coil 21 in accordance with the magnetic pole of the second magnet 22 facing the second coil 21. Since the driving force tilts the object lens 4 in the tangential direction, the tilt of the object lens 4 can be controlled by the voltage applied to the second coil 21.

In this embodiment, the similar effect can be obtained even when the installation positions of the second coil 21 and the second magnet 22 are reversed. Further, although the second coil 21 is shown in the state of an air core coil in this embodiment, the object can be obtained even when a so-called plunger type wherein a yoke such as an iron core is inserted into the air core part is applied. Here, the movement principle in the tilt of the object lens 4 is the same as those in the first and second embodiments.

As explained above, in this embodiment, since the mechanism for tilting an object lens 4 comprises a second coil 21 and a second magnet 22, it is possible to obtain an object lens actuator of a low cost and also it is possible to obtain an object lens actuator having a short total length.

Fourth Embodiment

Figure 10:
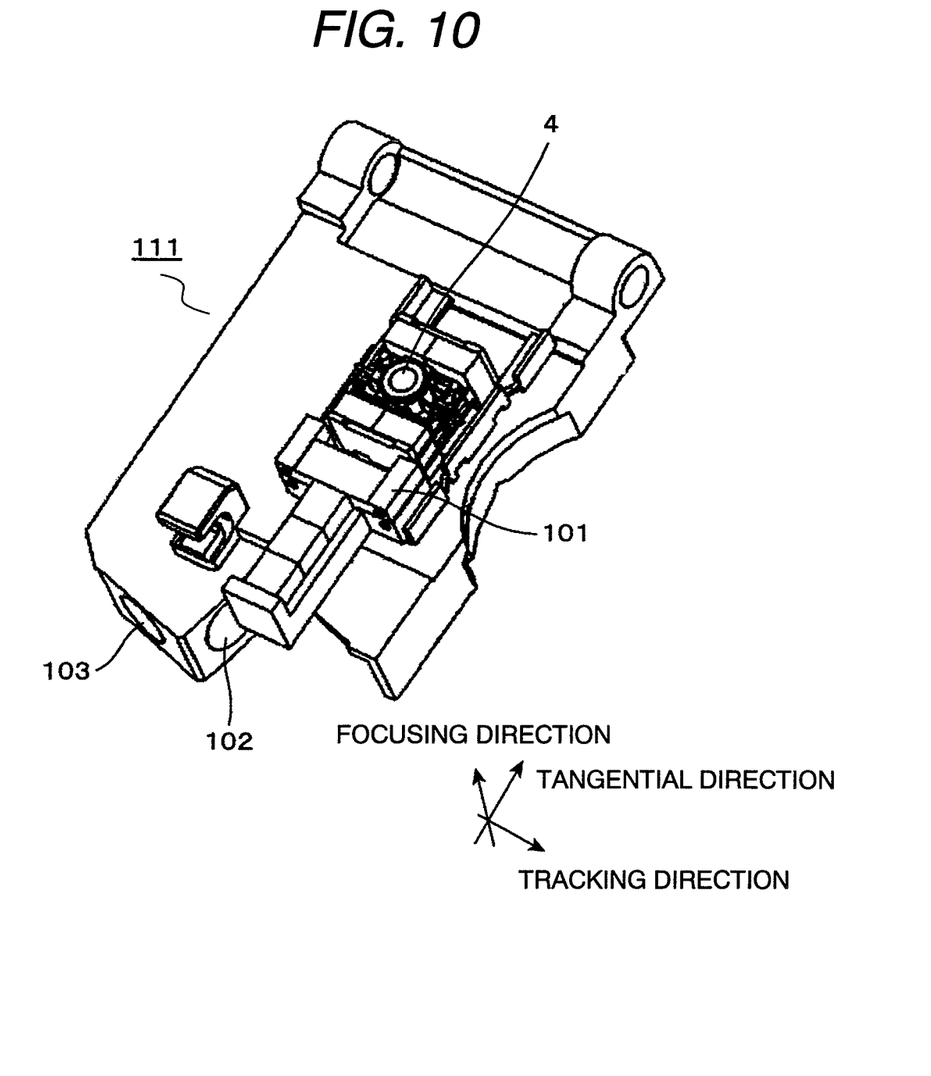
FIG. 10 is a perspective view showing an optical pickup using the object lens actuator according to the present invention.

Successively, an embodiment wherein an object lens actuator according to the present invention is installed on an optical pickup 111 is explained with FIG. 10. Note that, although an example of using an object lens actuator shown in the first embodiment is shown here, it is possible to configure the optical pickup 111 likewise also by using an object lens actuator shown in another embodiment.

As shown in FIG. 10, an object lens actuator 101 is installed on the optical pickup 111. Light emitted from light-emitting elements 102 and 103 is condensed on the optical disk with an object lens 4. In this way, it is possible to configure the optical pickup 111 suitable for densification by using the object lens actuator 101 according to the present invention.

Fifth Embodiment

Figure 11:
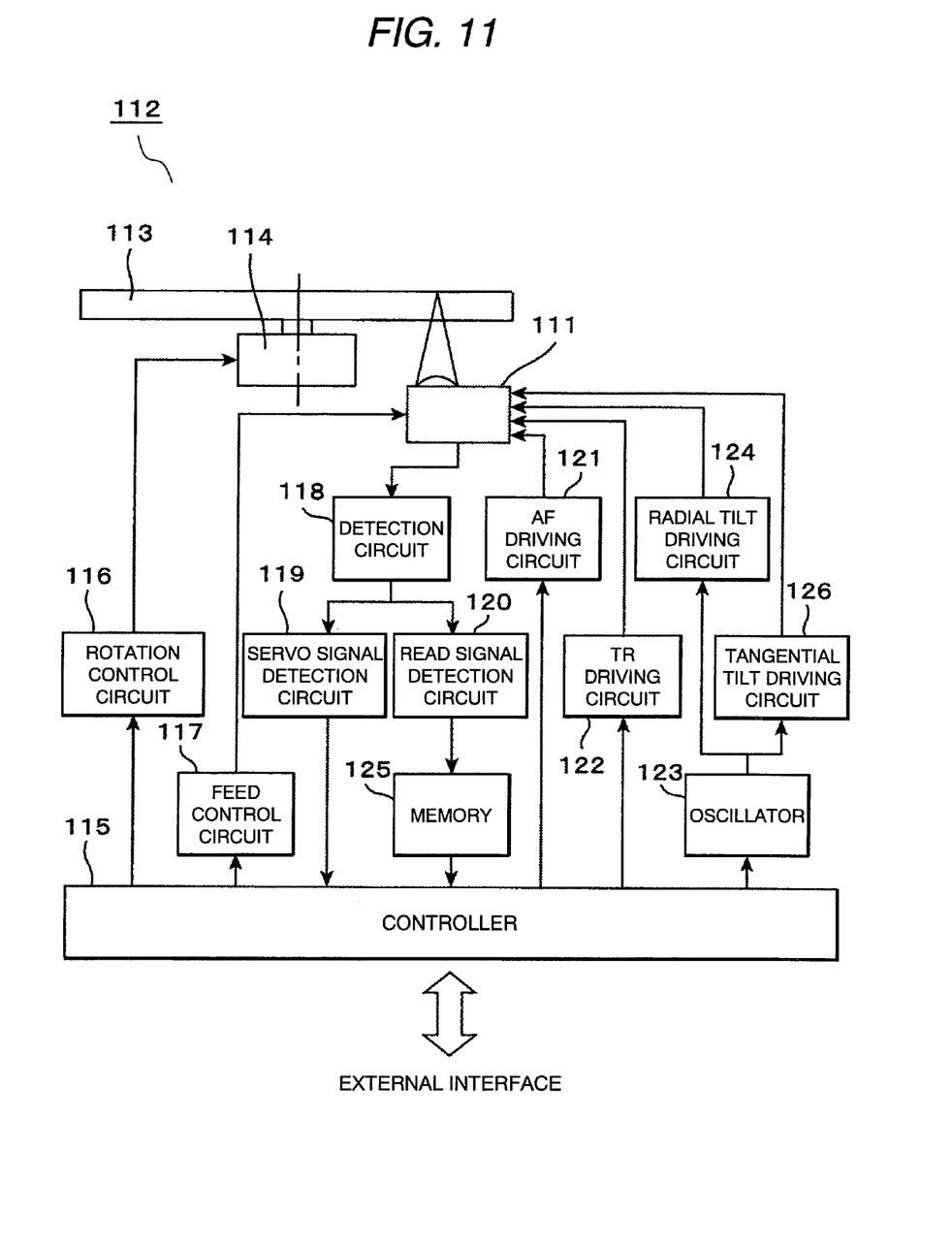
FIG. 11 is a diagram showing a circuit structure of an optical disk drive using the object lens actuator according to the present invention.
Figure 12:
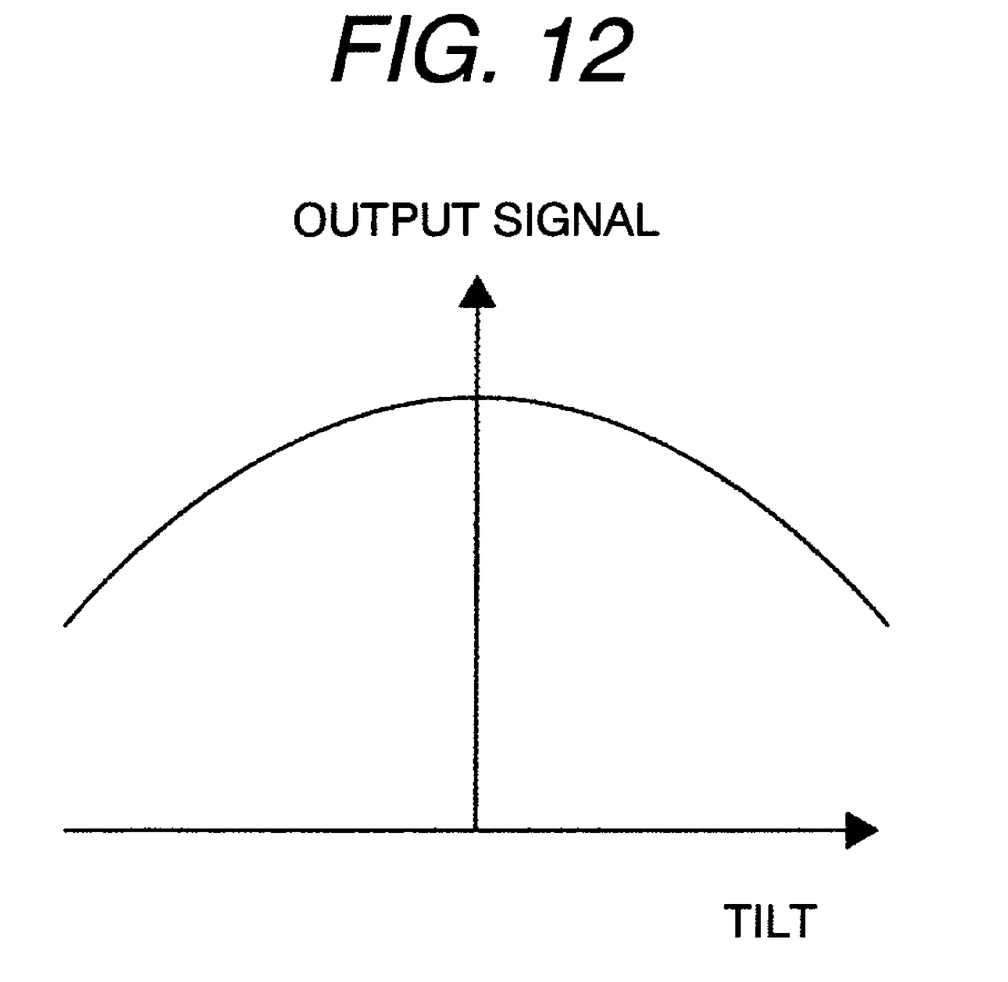
FIG. 12 is a graph showing a change of an output signal when the tilt of the object lens from the optical disk changes.

Successively, an embodiment of an optical disk drive 112 using an optical pickup 111 on which an object lens actuator according to the present invention is installed is explained with FIGS. 11 and 12.

The optical disk drive 112 is equipped with a spindle motor 114 for rotating an optical disk 113, an optical pickup 111, a moving mechanism for moving the optical pickup 111 in the radial direction of the optical disk 113, and a controller 115 for controlling the above devices. A rotation control circuit 116 for the spindle motor 114 is connected to the controller 115 and the rotation of the optical disk 113 attached to the spindle motor 114 is controlled. Further, a feed control circuit 117 for the optical pickup 111 is connected to the controller 115 and feed control for moving the optical pickup 111 in the radial direction of the optical disk 113 is carried out.

Various signals 118 detected with the optical pickup 111 are sent to a servo signal detection circuit 119 and a read signal detection circuit 120, focus error signals and track error signals are generated in the servo signal detection circuit 119, the position control of an object lens 4 in the focusing and tracking directions is carried out by signals sent from a focusing driving circuit 121 and a tracking driving circuit 122 in combination with commands sent from the controller 115.

The relationship between an output signal and the tilt of an object lens 4 from an optical disk 113 is shown in FIG. 12. From FIG. 12, the output signal takes the maximum value when the tilt of the object lens 4 from the optical disk 113 is zero. By using the phenomenon, it is possible to reduce the tilt of the object lens 4 from the optical disk 113 by tilting the object lens 4 in the radial or tangential direction and obtaining the tilt of the object lens 4 yielding the maximum output. That is, a radial tilt driving circuit 124 is driven through an oscillator 123, output signals while the optical disk 113 rotates in one round are temporarily stored in a memory 125, and the optimum radial tilt driving current is obtained. In the same way, a tangential tilt driving circuit 126 is driven through the oscillator 123, output signals while the optical disk 113 rotates in one round are temporarily stored in the memory 125, and the optimum tangential tilt driving voltage or current is obtained.

By applying the radial tilt driving current and the tangential tilt driving current to the radial tilt driving circuit 124 and the tangential tilt driving circuit 126 again, it is possible to reduce the tilt of the object lens 4 from the optical disk 113, and to realize the optical disk drive 112 suitable for densification. The function of obtaining the optimum driving voltage or current may be obtained by taking samples from the outermost and innermost circumferences of the optical disk 113 and using the samples by the linear approximation method. Here, it is possible to reduce the tilt of the object lens 4 from the optical disk 113 all over the optical disk 113 by taking samples from three or more positions on the optical disk 113 and obtaining an approximate expression of an n-dimensional function. By so doing, it is possible to obtain an optical disk drive of stable record/read signals and few data errors.

What is claimed is:

1. An object lens actuator comprising:
   a lens holder having an object lens and first coils;
   first magnets fixed to a yoke;
   a plurality of elastic support parts for supporting said lens holder with a first fulcrum;
   a moving part for supporting a portion of said plurality of elastic support parts with a second fulcrum different from said first fulcrum, and
   a fixed part having a moving mechanism for moving said moving part, the fixed part supporting another portion of said plurality of elastic support parts with another second fulcrum,
   wherein said first coils and said first magnets constitute first magnetic circuits, said first magnetic circuits adjust a focus of a laser on an optical disk of the lens holder, and said moving mechanism makes said moving part movable in a tangential direction of the optical disk.

2. The object lens actuator according to claim 1, wherein said first fulcrum is a rotatable fulcrum and said second fulcrum is a non-rotatable fulcrum.

3. The object lens actuator according to claim 1, wherein said moving mechanism makes said lens holder movable in a tangential tilt direction of said optical disk for read/write by driving said moving part.

4. The object lens actuator according to claim 1, wherein said moving mechanism comprises at least any one of a piezoelectric actuator, an electrostatic actuator, a stepping motor and an ultrasonic motor.

5. The object lens actuator according to claim 1, wherein said moving mechanism includes second coils installed on said moving part and second magnets installed on said fixed part, and said second coils and said second magnets constitute second magnetic circuits.

6. The object lens actuator according to claim 1, wherein said moving mechanism includes second coils installed on said moving part and a second magnets installed on said fixed part, and said second coils and said second magnets constitute second magnetic circuits,
   wherein each second magnet further has a north pole and a south pole on its surface facing said second coils.

7. The object lens actuator according to claim 1, wherein said moving mechanism includes second coils installed on said moving part and second magnets installed on said fixed part, and said second coils and said second magnets constitute a second magnetic circuit,
   wherein each second magnet has either a north pole or a south pole on its surface facing said second coils.

8. An optical pickup having the object lens actuator according to claim 1.

9. An optical disk drive having the optical pickup having the object lens actuator according to claim 1.

* * * * *